W. O. SNELLING.
CRACKING OILS.
APPLICATION FILED OCT. 15, 1913.
1,371,268.
Patented Mar. 15, 1921.
3 SHEETS—SHEET 1.
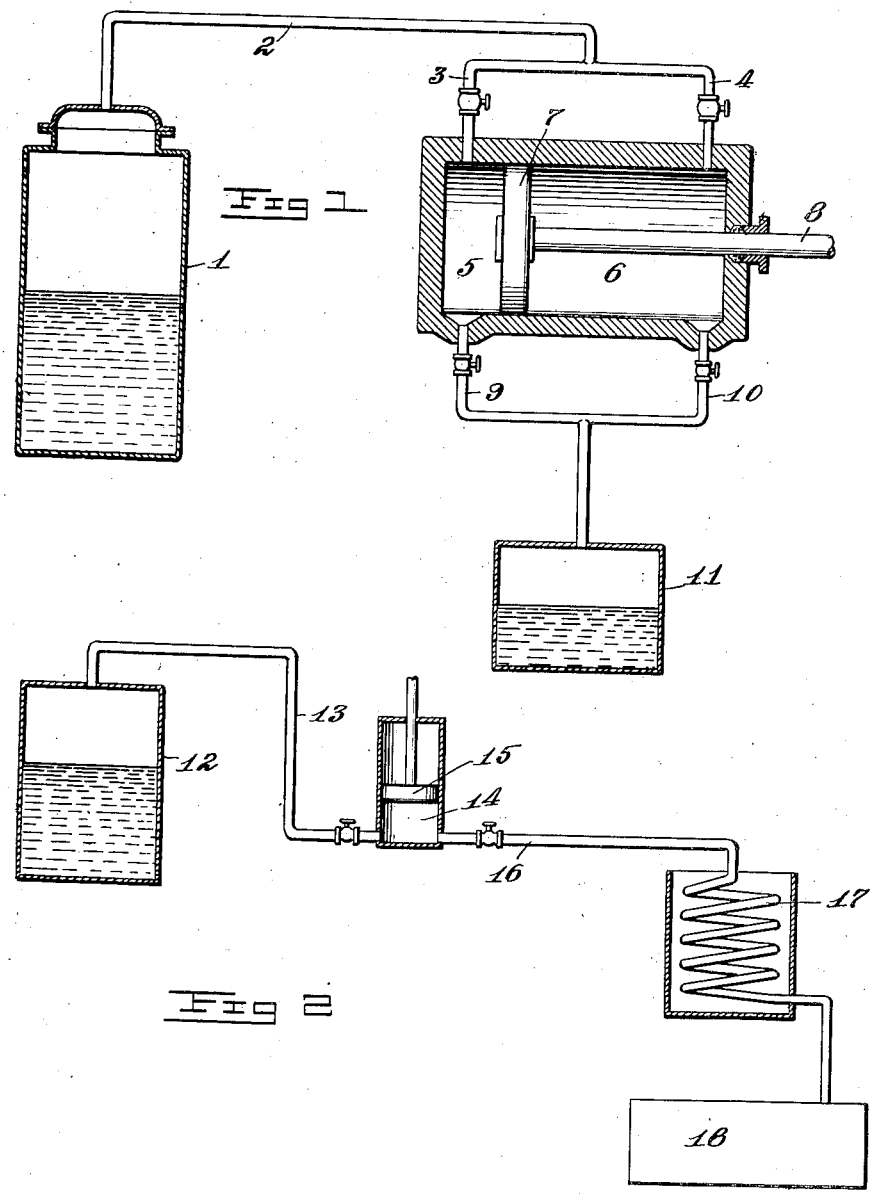

W. O. SNELLING.
CRACKING OILS.
APPLICATION FILED OCT. 15, 1913.
1,371,268.
Patented Mar. 15, 1921.
3 SHEETS—SHEET 2.
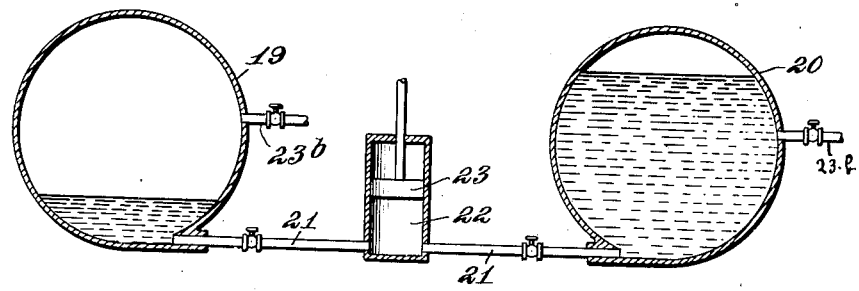
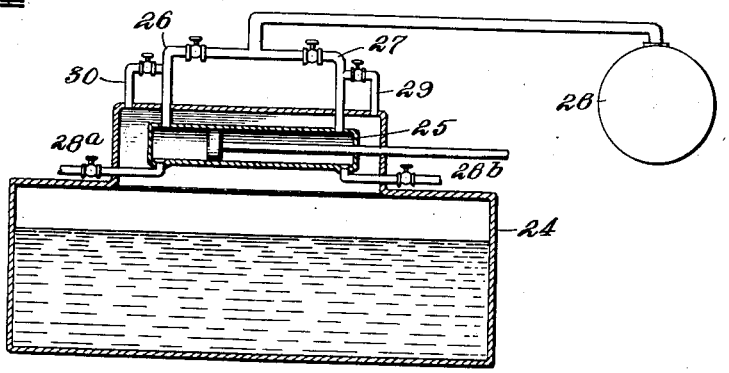
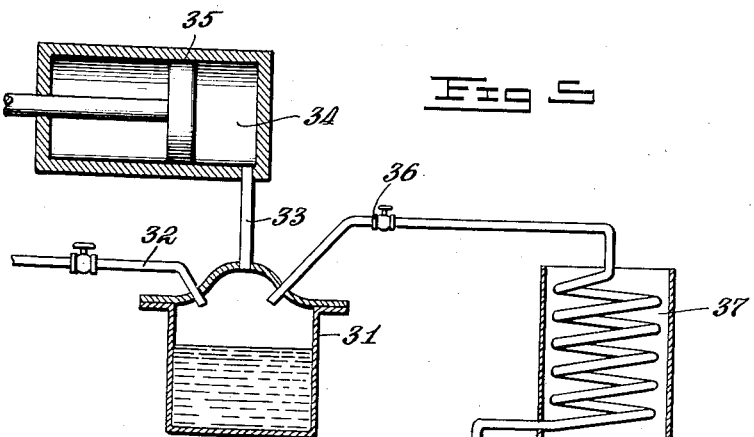

W. O. SNELLING.
CRACKING OILS.
APPLICATION FILED OCT. 15, 1913.
1,371,268.
Patented Mar. 15, 1921.
3 SHEETS—SHEET 3.
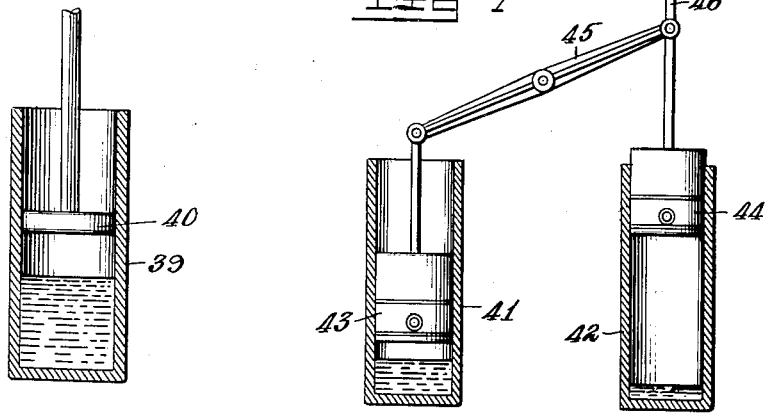
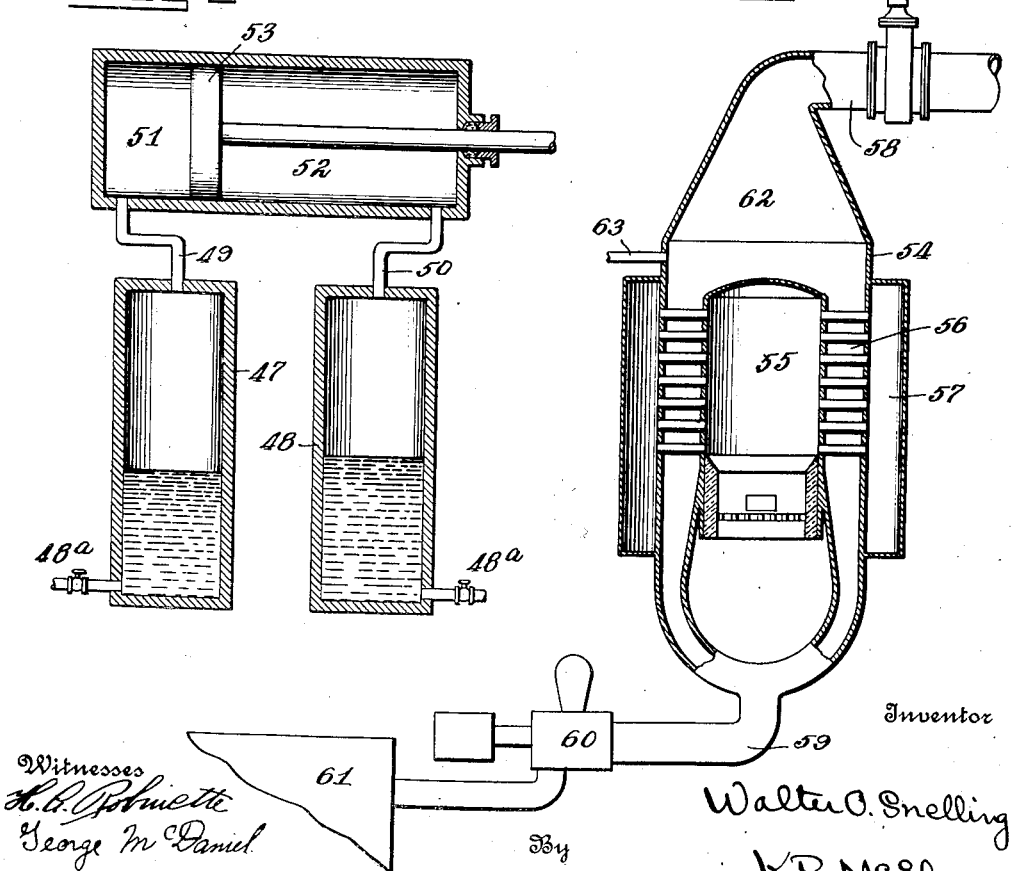

UNITED STATES PATENT OFFICE.

WALTER O. SNELLING, OF PITTSBURGH, PENNSYLVANIA.

CRACKING OILS.

1,371,268. Specification of Letters Patent. Patented Mar. 15, 1921.

Application filed October 15, 1913. Serial No. 795,323.

*To all whom it may concern:*

Be it known that I, WALTER O. SNELLING, a citizen of the United States, residing at Pittsburgh, in the county of Allegheny and State of Pennsylvania, have invented certain new and useful Improvements in Cracking Oils, of which the following is a specification.

This invention relates to cracking oils; and it comprises a method of converting high-boiling oils into lower-boiling products wherein a liquid body of oil at a high, or cracking, temperature is maintained in contact with a confined body of vapors for a period of time, such body of vapor during such period being caused to vary in volume from time to time; and it further comprises an oil-cracking apparatus comprising means for maintaining liquid oil at a high temperature in contact with a confined body of its own vapors and means for periodically altering the relative volumes of such liquid and of such vapor without material alteration of temperature or pressure; all as more fully hereinafter set forth and as claimed.

One of the recognized methods of obtaining increased yields of lower boiling products from petroleum is termed "cracking" and consists in submitting the higher boiling oils to heat at or above the normal boiling point. Pressure is usually employed to heighten the boiling point and, thereby, the temperature which can be employed. In some way, the mechanism of which is not recognized, the high boiling oils when heated to a high temperature in a liquid state tend to break down, or undergo a molecular change, which results in the formation of low boiling oils such as gasolene, kerosene, etc. It is a recognized fact that in heating the liquid oil for cracking purposes some escape of vapor or formation of vapor must be permitted; that a simple heating to cracking temperatures in a closed container of uniform temperature, like an autoclave, without permitting escape of vapors, does not give the desired results to the desired extent. Only a small amount of cracking takes place under these conditions. Where distillation, or continuous formation and escape of vapors, is permitted the cracking action goes on further. For some reason, cracking seems to take place with the greatest readiness at the moment when the change from the liquid to the vapor state occurs. In cracking stills with an air cooled top it is recognized that the condensation of vapors on the top and return of condensates to the body of oil in the still aids in cracking. If a free flow of vapors away from the main mass of oil in the still be permitted, however, of course much of the vapor going to the condenser is that of the high boiling oil itself since the oil is generally heated to its boiling point under the prevailing pressure. Only a fraction of the vapors coming from the still is that of the low boiling materials produced. If any ordinary system of distillation with recondensation be adopted, cooling is necessarily involved; the vapors are allowed to drop below the cracking temperature.

In the present invention I have devised a method of producing a far going cracking in high boiling petroleum products in which these known conditions are recognized and utilized, the material under treatment being kept in a condition of maximum sensitiveness, or susceptibility to the cracking process and caused to undergo repeated changes back and forth between the vapor and the liquid condition. After the cracking change has gone forward under these conditions to a desired extent with production of lighter, lower boiling products, a portion of the vapors may be released, and the residual oil again treated.

In my process I maintain heated oil under pressure in a container and in free contact with a confined body of its own vapor. This vapor however during the time of the cracking operation is not allowed to escape permanently; neither is it cooled in any way. There is a "system" composed of a "liquid phase" and a "vapor phase" in equilibrium as to pressure and temperature. The temperature of course is that at which the oil will crack and the pressure is sufficient to insure the existence of the liquid phase. In this system, without permitting any material alteration of temperature or pressure, from time to time I contract the space occupied by the vapor, and lessen its volume causing liquefaction. Between these periods of contraction, I interpose periods of reëxpansion of the vapors. For example, I may maintain a volume of oil in a suitable container at a high temperature and under, say, 700 or 800 pounds pressure. As heating and cracking go on, the vapor space becomes filled with vapor under this pressure. I now lessen the volume of the vapor, as by pushing in a piston or by feeding more oil to the bottom of the body of oil; the particular means adopted depending upon the particular apparatus used. The volume of vapor diminishes without a drop in temperature; the influence of compression, as a matter of fact, being to heat it somewhat. In this contraction of vapor volume, the high-boiling oil vapors tend to go back into or be reabsorbed by the body of liquid oil to a greater extent than the vapors of low boiling products and the concentration of the vapors of low-boiling bodies in the vapor body or phase therefore becomes greater. As the liquid phase and the vapor phase are in equilibrium and at the same temperature and pressure little force is required to produce this change. After the absorption of the high-boiling oils, I may again allow a reëxpansion. More of the vapors of the low boiling cracked products now go into the body of vapor. This operation I may repeat a number of times. It will be seen that I am in effect securing the same results at each expansion as in heating where distillation or escape of vapor is permitted, but without cooling the vapors and without allowing the escape of heavy oil vapors, and that while in the ordinary distilling operation but one change from liquid to vapor occurs, here there may be as many such changes as are required. Under the described conditions, a far going cracking of a heavy oil may be obtained in a single heating operation; a greater extent of cracking than is possible in the usual methods, and the vapor mass finally produced contains a greater proportion of low boiling bodies. For example, I have converted a gas oil of a specific gravity .85, or 34.5 Baumé, into gasolene of specific gravity .70 or 70 Bé. with a yield of a third of its volume. The remaining two-thirds was an excellent fuel oil and susceptible of retreatment in the same manner. After the vapors in contact with the hot oil have been exposed to as many expansions and contractions as may be desired, distillation or escape of vapors may be allowed to occur. Distillation is best done in a period of contraction.

A wide variety of apparatus may be used in performing the described process. The oil may be heated in a vessel capable of withstanding pressure and generally like an engine cylinder, carrying a piston which may be moved up and down by suitable motive power. Two such cylinders and pistons may be coupled to reduce the work necessary; expansion being permitted in one cylinder while compression is going on in the other. A still or an autoclave-like vessel may have its vapor space connected with a pump cylinder. Or a cylinder may be provided with a piston adapted to be moved by power and two still-like vessels may be connected with such cylinder on the two sides of the piston. This gives expanding vapor from one still to help in the compression of the vapor from the other still and vice versa, thereby reducing the consumption of power. Two horizontal or other stills capable of withstanding pressure may be connected through a conduit at their base, this conduit being provided with a suitable pump. By operating the pump the oil may be alternately pumped from the one still into the other, thereby permitting expansion of the vapor in contact with the oil in the one still and causing reduction in volume of the vapor in contact with the oil in the other still. Another method of operating, is to pass oil from time to time into the base of the still and again withdraw it. On introduction of fresh oil under pump pressure, the hotter lighter oil at the cracking temperature floating on the incoming oil will be forced toward the top of the still, lessening the volume of the vapor space. On again allowing the lower oil to flow out, the vapors above the upper hot oil are allowed to expand. A good method however is simply to connect a vapor pump with the top of the still and alternately remove the vapor and force it back again. The pump should be kept hot. For this purpose it may be mounted in the top of the still. Still another, and very advantageous method is to use a still as a source of hot vapors and connect it by a pair of valved conduits with the two ends of a cylinder having a piston adapted for motion by external power. This cylinder should be heat-insulated. On now filling the cylinder with hot vapor, cutting off both connections with the still and moving the piston back and forth alternate liquefaction and reëxpansion of the vapor on each side will take place without consumption of any more power than is necessary to overcome friction. Leakage past the piston, since the material on each side is of the same character, is of course immaterial and the piston need not be particularly tight fitting. With this type of apparatus and others where reduction of volume takes place in a cylinder structurally separate from the still, it is convenient to withdraw the liquid produced at the end of a compression stroke and send it to storage for subsequent distillation in an appropriate still. Residual vapor in the cylinder mixes with a new charge of vapor.

In all these operations, the compression and rarefaction should be slow so as not to obtain any great increase or decrease in pressure or temperature. As many as 15 or 20 alternating expansions and contractions of the vapor during the maintenance of the system at a cracking temperature may be allowed to take place with advantage.

In all these modifications it will be noted that a body of oil heated to a cracking temperature is held in contact with its own vapors and during this contact the relative volumes of the liquid phase and the vapor phase are varied at intervals, thereby producing alternating release and absorption of vapors from the vapor phase by the liquid phase. This body of oil may be that which has afforded the vapors; i. e., it may be residual unvaporized oil, or it may be oil condensed from the vapors in the compression period.

In the accompanying illustration I have shown, more or less diagrammatically, certain of the many types of apparatus adapted for use in the present process. In this showing:

Figure 1 is a diagrammatic view, partly in vertical section, of an apparatus in which chambers on the two sides of a piston are used alternately;

Fig. 2 is a similar view of another structure having a single outside chamber provided with a piston;

Fig. 3 is a similar view of a modification in which the oil in a pair of stills is passed from one to another in expanding and contracting the vapor space;

Fig. 4 is a similar view of another modification having an internal compressing mechanism;

Fig. 5 is a view of another form;

Fig. 6 is a similar view of a simple structure having the piston within the oil heating vessel;

Fig. 7 is a similar view of a pair of structures like that of Fig. 6 mounted for operation in alternation;

Fig. 8 is a similar view of another structure having two oil treating vessels; and Fig. 9 is a similar view of a structure operating in principle something like that of Fig. 3.

In Fig. 1, element 1 is a still or other vessel provided with means for heating (not shown) and having a vapor outlet 2. As shown this vapor outlet communicates through a pair of valved twin conduits 3 and 4 with the chambers 5 and 6 on the two sides of piston 7, driven through rod 8 from an external source of power (not shown). The two chambers communicate respectively through valved conduits 9 and 10 with a storage reservoir 11. In Fig. 2, element 12 is a source of oil vapor which communicates through conduit 13 with compression and expansion chamber 14 behind piston 15. Conduit 16 removes oil or vapor through cooler 17 to storage reservoir 18. In Fig. 3, elements 19 and 20 are a pair of stills, which may be of any ordinary type and provided with the usual vapor and gas removing means (not shown) the liquid bodies in the stills communicating by conduit 21 with pump 22 provided with piston 23. Connection 23ᵇ allows removal of oil from time to time. In Fig. 4, oil still 24 is provided near its top with expansion and contraction chamber 25 communicating through valved conduits 26 and 27 with storage reservoir 28. By-passes 29 and 30 establish vapor communication of 26 and 27 with the still 24. In Fig. 5, oil-heating vessel 31, provided with oil inlet 32 communicates through 33 with expansion chamber 34 behind piston 35. Oil vapors pass through valved conduit 36 to cooler 37 and storage chamber 38. In Fig. 6, element 39 is a vessel which may be heated in any suitable manner and is provided with piston 40. In Fig. 7, elements 41 and 42 are a pair of chambers like that of Fig. 6, each provided with a piston (43 and 44) coupled through yoke 45 and deriving power through 46. In Fig. 8 are a pair of oil stills 47 and 48 communicating through vapor leads 49 and 50 with the two chambers 51 and 52 on opposite sides of piston 53. In Fig. 9, shell 54 is shown as provided with internal firing means 55 communicating through fire tubes 56 with waste gas removing means 57. At the top, the shell is provided with gated vapor conduit 58 and at its base with oil inlet 59, deriving oil through pump 60 from storage chamber 61.

In the structure of Fig. 1, the still 1 is used merely as a source of hot oil vapors. Vapors from the still are led into chambers 5 and 6 through 3 and 4. These chambers are maintained hot during the operation. The valves of 3 and 4 and of 9 and 10 being closed, element 8 is reciprocated. In the position shown, the vapor in 6 is expanding and that in 5 being compressed. In the compression of the vapor in 5, much of the vapor phase is converted into the liquid phase, while in 6 much of the liquid phase is converted into the vapor phase. The pressures in the two chambers nearly balance and reduce the work in the system. After 8 has been slowly reciprocated a suitable number of times with as many liquefactions and revaporizations of the oil accumulating in each chamber as may be desired, liquefied oil is drawn off from the chamber in compression, say 5, through 9 and sent to storage tank 11 for distillation in any suitable manner. New vapor is now admitted to 5 through 3, vapor in 6 compressed, the liquid drawn off, new vapor admitted through 4 and the cycle rebegun. In the operation of the structure of Fig. 2, the vapors in 12 are alternately expanded and contracted in volume as the vapor space afforded by the space above the liquid in 12, in conduit 13 and chamber 14 is alternately rendered greater or less by reciprocation of 15. When the vapor has been subjected to as many treatments as may be desired the valve in 13 is closed, that in 16 opened and the hot condensed liquid formed in 14 is run to storage through cooler 17. In Fig. 3, two stills are coupled in such a manner that a large body of oil may be run alternately from one to the other, thereby contracting and expanding the space available for vapor in each. As shown, the vapor above the oil in 19 is in a period of expansion, while that above 20 is in a period of contraction. After the oil has been run from 19 to 20 and vice versa a number of times, the vapors may be permitted to escape through a conduit to a condenser (not shown) from the chamber in which the vapor is in a state of compression. In Fig. 4, the compression member 25 is mounted in the still to facilitate its being maintained at the required high temperature. A charge of oil vapor may be admitted into the chamber to the left of the piston through 30 and 26 and a similar charge in the chamber to the right through 29 and 27. After a sufficient number of alternations of the piston with alternate partial liquefaction and reëxpansion of the oil vapors, both charges may be allowed to escape into 28. In this structure it is more convenient to allow the escape of vapor in a period of expansion. Connections 28$^b$ may however be provided for removing liquid oil in a compression stage. In Fig. 5, 31 is supplied with oil through 32. The vapors in 31 are in free communication through 33 with chamber 34 which is alternately expanded and contracted by 35. After a sufficient number of alternations vapor may be allowed to escape through 36 to 37 and condensed oil stored in 38 for subsequent distillation. In Fig. 6 a charge of oil is maintained in 39 and the space allowed for vaporization alternately expanded or contracted by reciprocation of 40. The operation is the same in Fig. 7 but two pistons are coupled through 45, thereby minimizing the amount of work done by the external source of power 46. In Fig. 8 is an application of the same principle of performing expansion on one side of a piston while compression is operating on the other. In this structure, as shown, the vapors in 47 and 51 are being lessened in volume by 53, while the vapors in 48 and 52 are in expansion. After a suitable number of alternations liquid oil may be allowed to escape past pressure reducing valves 48$^a$ into a cooling and storage system (not shown). Fig. 9 shows a fire-heated oil still in which the liquid level can be raised and lowered by pumping in oil through 59 and allowing it to flow out therethrough. As the oil rises and sinks the space 62 available for vapor increases and diminishes. The heated oil will overlie the cold oil reciprocating up and down without mixing materially therewith. From time to time the valve in 58 may be opened and the vapors allowed to pass to any condensing means (not shown). Surface oil may be drawn off from time to time through 63.

At the temperature and pressure of the system, which in each case is at a cracking temperature vapor and liquid phases of heavy high boiling oils are able to coexist, but at such temperature and pressure there is little tendency for the low-boiling products to liquefy. The alternating liquefaction and re-vaporization are therefore mainly of the high boiling oil. As the amount of vapors of low boiling oils steadily increases as the operation goes on, it is often convenient to make the travel of the piston or traverser less in the later stages of the operation than in the earlier, to allow for a greater volume of vapor in the later stages.

In the use of such a structure as that of Fig. 4 or Fig. 8, whose operation is typical of that of the other figures, with the pump cylinder at the cracking temperature, reciprocation of the piston may be at the rate of about two complete strokes per minute. Other things being equal, the slower the rate of discharge of treated material, or which is the same thing, the greater the number of alternating compressions and decompressions to such material is exposed the better is the product; i. e., the less unsaturated it is. In practice the material in the compression space is always changing with feed and discharge, but it should average 20 or 30 compressions before complete discharge. At such a rate, the efficiency of the operation is about double that of cracking at the same temperatures without alternating compression and decompression of the vapors; and the products are of higher grade. A pressure of 30 to 100 pounds works well, but I generally adopt one around 65 pounds in the compression stroke. Low temperature, high pressure and frequent compressions as a rule work better than high temperatures, less pressure and fewer compressions.

What I claim is:—

1. In the cracking of oils, the process which comprises maintaining a body of oil at a cracking temperature in free contact with a confined body of its own vapors and at one time during such maintenance exerting pressure from an external source upon such confined body of vapors to reduce its volume and cause liquefaction of oil therefrom.

2. In the cracking of oils, the process which comprises maintaining a body of oil at a cracking temperature in free contact with a confined body of its own vapors and at one time during such maintenance exerting pressure from an external source upon such body of vapors to reduce its volume and after such reduction of volume permitting an escape of vapors.

3. In the cracking of oils, the process which comprises maintaining a body of oil at a cracking temperature in free contact with a confined body of its own vapors, during such maintenance alternately enlarging and contracting the volume of such vapor body a plurality of times and thereafter permitting the vapors to escape, such escape being during a period of lessened vapor volume.

4. In the cracking of oils, the process which comprises maintaining a body of oil at a cracking temperature under pressure, permitting vapors to form in comparatively large volume, exerting mechanical pressure upon such vapors while in contact with the oil to cause a reabsorption of heavy oil vapors by such oil and thereafter permitting remaining vapors to escape.

5. In the cracking of oils, the process which comprises maintaining a body of oil at a cracking temperature in contact with a confined body of its vapors and during such heating causing fluctuations in the pressure of such vapors by temporary applications of pressure from another source.

6. In the cracking of oils the process which comprises maintaining a body of oil at a cracking temperature in contact with a confined body of its own vapors and from time to time applying compressive mechanical pressure on the vapor body.

7. In the cracking of oils the process which comprises maintaining a body of oil at a cracking temperature in contact with its vapors and periodically altering the relative volumes of the vapor and the liquid phases without substantial change in temperature a plurality of times prior to permitting any escape of vapor.

8. In cracking oils, the process which comprises establishing in a suitable container a system consisting of a body of liquid petroleum oil and a body of vapor therefrom, both being at a cracking temperature, and altering a plurality of times the space available for such system in such manner that at a period of greater volume a portion of the liquid oil passes into vapor and at a period of less volume a portion of the vapor passes into liquid.

9. In cracking oils, the process which comprises establishing and maintaining a system composed of liquid oil and vaporized oil, both being at a cracking temperature and being substantially in equilibrium, and repeatedly altering the volume available for such system in such a manner as to cause a major fraction of the oil to pass back and forth between the vapor state and the liquid state a plurality of times, the volume alteration being effected at such a rate as to cause no substantial change in temperature.

10. In the cracking of oil the process which comprises establishing a body of liquid oil and a body of vaporized oil at a cracking temperature and in equilibrium, and repeatedly slowly altering the volume of the space occupied by such vapor so as to cause alternate liquefactions and expansions of such vapor, the volume alteration being effected at such a rate as to cause no substantial change in temperature or pressure.

11. In the cracking of oil the process which comprises establishing a body of liquid oil and a body of vaporized oil at a cracking temperature and in equilibrium, and repeatedly slowly altering the volume of the space occupied by such vapor so as to cause alternate liquefactions and expansions of such vapor without substantial change in temperature or pressure, said oil and said vapor being in substantial equilibrium throughout the operation.

12. In an oil cracking system, a source of oil vapors, a chamber for containing a body of such vapors and means for repeatedly altering the volume of such chamber while maintaining such vapors in contact with liquid oil.

In testimony whereof, I affix my signature in the presence of two subscribing witnesses.

WALTER O. SNELLING.

Witnesses:
M. WILLIAMS,
A. J. PHILLIPS.